US005972153A

United States Patent [19]

Focke et al.

[11] Patent Number: 5,972,153

[45] Date of Patent: Oct. 26, 1999

[54] METHOD FOR MANUFACTURING LABELS AND APPLYING THEM TO PACKETS

[75] Inventors: Heinz Focke, Verden; Hans-Jürgen Bretthauer, Bremen; Jürgen Röse, Kinchlinteln, all of Germany

[73] Assignee: Focke & Co. (GmbH & Co.), Verden, Germany

[21] Appl. No.: 08/969,205

[22] Filed: Nov. 12, 1997

[30] Foreign Application Priority Data

Nov. 19, 1996 [DE] Germany ........................... 196 47 670

[51] Int. Cl.$^{6}$ ...................................................... B32B 31/00

[52] U.S. Cl. .......................... 156/256; 156/270; 156/277; 156/291; 156/353; 156/387; 156/475; 156/521; 156/529; 156/566; 83/24; 83/27; 83/28; 83/152; 83/155

[58] Field of Search ..................................... 156/256, 290, 156/521, 578, 568, 361, 364, DIG. 4, 353, 270, 277, 387, 529, 566, 567, 291, 475; 29/DIG. 78; 83/24, 27, 28, 152, 155

[56] References Cited

U.S. PATENT DOCUMENTS

| | | | |
|---|---|---|---|
| 3,556,909 | 1/1971 | Stegman | 156/521 |
| 3,710,667 | 1/1973 | Kluger | 83/203 |
| 3,915,785 | 10/1975 | Muller | 156/351 |
| 4,077,289 | 3/1978 | Rudszinat | 83/152 |
| 4,124,429 | 11/1978 | Crankshaw | 156/364 |
| 4,312,699 | 1/1982 | Erdmann et al. | 156/415 |
| 4,421,587 | 12/1983 | Guenther et al. | 156/256 |
| 4,544,431 | 10/1985 | King | 156/256 |
| 5,197,812 | 3/1993 | Worley et al. | 400/635 |
| 5,584,955 | 12/1996 | Instance | 156/267 |

FOREIGN PATENT DOCUMENTS

| | | | |
|---|---|---|---|
| 105680 | 4/1984 | European Pat. Off. | 156/251 |
| 605838 | 7/1994 | European Pat. Off. | 53/387.2 |
| 675456 | 10/1941 | Germany . | |
| 1225102 | 9/1966 | Germany . | |
| 3621879 | 1/1988 | Germany . | |
| 4235516 | 4/1993 | Germany . | |
| 4241176 | 6/1994 | Germany . | |
| 4417707 | 11/1995 | Germany . | |

*Primary Examiner*—Curtis Mayes
*Assistant Examiner*—Linda L. Gray
*Attorney, Agent, or Firm*—Sughrue, Mion, Zinn, Macpeak & Seas, PLLC

[57] ABSTRACT

A method for manufacturing labels and for applying each of the labels to an end wall of a cigarette packet. The method includes separating the labels from a continuous web moving in a horizontal direction with the width of the web parallel to a vertical plane. Only one side of the web is provided with printed areas for a succession of the labels, and severance cuts are provided in the web to form the labels between the areas. Separation of the labels occurs at the cuts. After the labels are separated, they are continuously transported by a suction conveyor belt moving in a vertical plane substantially parallel to the vertical plane of the web. The labels are held separated from each other by negative pressure from the belt which acts on the printed side. Glue is applied to the print-free side of the labels on the belt by a phased and non-contact application of at least on row of successive glue spots extending along the longitudinal dimension of the label. Then the labels are applied to the packets.

3 Claims, 7 Drawing Sheets

METHOD FOR MANUFACTURING LABELS AND APPLYING THEM TO PACKETS

BACKGROUND OF THE INVENTION

The invention relates to a method and device for manufacturing (printed) band labels, especially revenue stamps, and for applying same to packets, preferably on an end wall of a cigarette packet, by gluing.

The application of band labels (revenue stamps), i.e. of generally rectangular long blanks of paper or the like, to packets is a special problem in the manufacture of cigarette packages. Each of these packets is provided during manufacture with a revenue stamp, which normally extends in the region of an end wall of the cigarette packet transversely across same, making a U-shaped fold. The label (revenue stamp) is attached to the packet by gluing. Manufacture, gluing and conveying of the labels are a particular problem on high-capacity packaging machines.

SUMMARY OF THE INVENTION

The purpose underlying the invention, therefore, is on a packaging machine, especially for cigarettes, so to improve the areas of manufacture, of conveying, of gluing and of transfer to the packet, that trouble-free leading of the labels to the packets is guaranteed, even at high working speeds.

In fulfilment of this purpose, the method according to the invention is characterised by the following features:

a) the long rectangular band labels are separated one after the other from a continuous web of material, b) the band labels are arranged with their longitudinal extension transverse to the web of material, in such a way that the width of the material web corresponds to the length of one band label, c) the web of material has printed areas for successive band labels, severance cuts being carried out to form one band label between successive printed fields of the material web, d) the band label is provided with glue after it has been separated from the material web and on a side which is free of printing, e) the band label is then led to the packet and applied to same.

The individual band labels are thus produced in the region of the packaging machine by being separated from a continuous web of material, the band labels being formed lying across the web of material. In this way, greater efficiency in the manufacture of the band labels is possible. Whilst the band label is being transported to the packet, glue is applied to the rear side of the label, especially through the application of preferably two parallel rows of glue spots. This contact-free application of glue likewise guarantees an improvement in efficiency.

The band labels separated from the material web are, in accordance with the design of the device according to the invention, transported by a suction conveyor, especially by suction belts which grasp the band label on the printed side. In the region of the conveying path of the band labels, a stationary gluing unit is located, especially two adjacent glue nozzles which are activated in phases and thus, during the continued movement of the band labels, transfer rows of glue spots on to the free side of the labels.

Further features of the invention relate to the handling of the material web and the control of a cutting unit as well as to the conveying of and application of glue to the band labels. Details of a device according to the invention as well as the method steps are explained more fully below with the aid of the patent drawings. These show:

DESCRIPTION OF A PREFERRED EMBODIMENT

Figure 6:
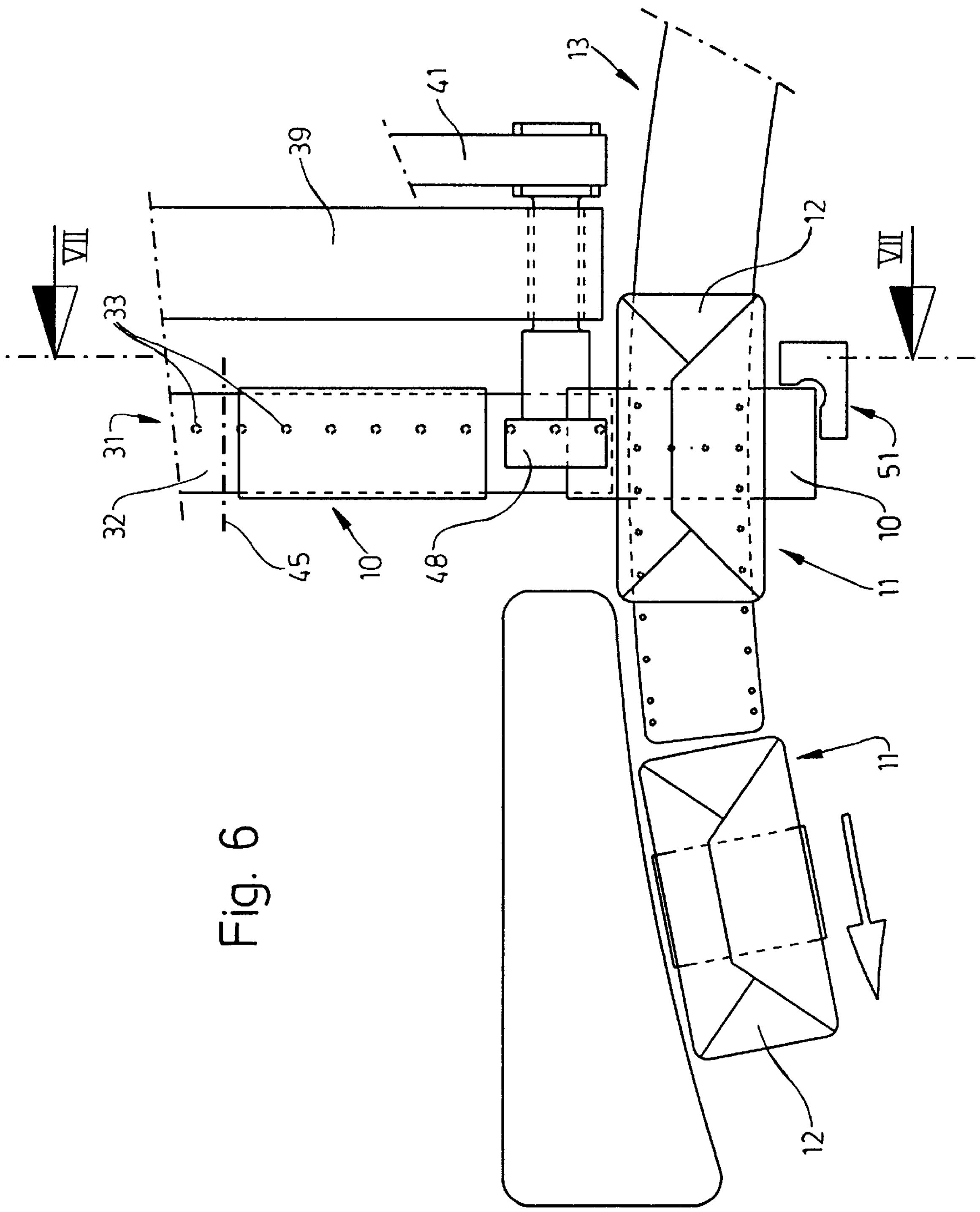

The details of the embodiment shown here refer to the manufacture of band labels 10 and the leading of same to a cigarette packet 11. The latter is, in the present example (especially FIG. 6), a soft-case packet. The band label 10 is led towards an end wall 12 of the cigarette packet. On a soft-case packet, this end wall 12 is formed from flaps, folded in envelope fashion, of an inner wrapping of the packet made of paper or of tin foil. The band label 10 is generally—as in the present example—positioned with its longitudinal extension transverse to the rectangular end wall 12 and is connected, making a U-shaped fold, with the end wall 12 and the adjacent large-area packet walls (front wall and rear wall). To this end, a device is advantageously used, such as is shown in connection with a rotary folding unit in EP 605 838. The band label 10 is, to this end, led in a radial direction towards the rotary folding unit on the present embodiment from the top towards the bottom. The upright band label 10 is laid on to the cigarette packet 11 which is positioned with its end wall 12 aligned transversely. This process is aided by a suction-holding means 13 which guides the band label in the way described in EP 605 838 as far as its transfer to the cigarette packet 11 in an exact relative position.

The band labels 10 are so-called revenue stamps. The longish rectangular band labels 10 generally consist of paper and are provided with printing on the outer side (on the finished cigarette packet 11). An opposite inner side is connected by gluing with the described areas of the cigarette packet 11.

The band labels 10 are separated from a continuous web of material 14. The width of this material web 14 corresponds exactly to the length of a band label 10. Through a transverse severance cut, a band label 10 is separated in each case at the front end of the material web 14. The band labels 10 are carried away in a direction transverse to the web of material 14, in the present case in a downward direction.

The material web is provided on its outer side with printed areas 15. These correspond to the required printing on a revenue stamp 10 on its outer side. On the opposite side of the material web 14, i.e. on the rear side of the band labels 10, printed marks 16 are applied. These are scanned by a mark reader 17 to control the position and the movement of the material band 14 and to position the severance cut exactly.

The band label 10 is drawn in the region of the packaging machine from a reel (not shown) and led via a deflection roller 18 into a vertical plane. The deflection roller 18 is followed by the mark reader 17, which is accordingly positioned in the region of a vertical conveying section.

The material web 14 is then deflected by 90° into a horizontal conveying direction. The material web 14 is here kept in an upright plane. An obliquely positioned deflecting rod 19 serves to deflect the web. The material web 14 is led away sliding over the cylindrical casing surface of the deflection rod. Said rod 19 may be changed with respect to its relative position. To this end, the deflection rod 19 is attached to an adjusting sleeve 20, which may be displaced by means of an adjusting screw 21, namely may be moved up and down. The deflection rod 19 is aligned at an angle of 45°.

In the region of a section of the material web 14, running in a horizontal direction and yet in an upright plane, the transversely running severance cut is carried out to separate in each case one band label 10. A separating unit 22 consists of a circulating cutter wheel 23 and a cutting blade 24 circulating with same. This blade works together with a stationary counter blade 25. The cutter wheel 23 rotates around a vertical axis. Correspondingly, separating blade 24 and counter blade 25 are positioned in upright planes.

The material web 14 is led towards the separating unit 22 by exactly controlled feed rollers 26 and 27. These also rotate around upright axes. One feed roller 27 is driven via a synchronous belt drive 28. The other feed roller 26 is connected with feed roller 27 via a toothed wheel 29 to move with same. The feed rollers 26, 27 are controlled by the mark reader 17 with the aid of printed marks 16, in such a way that a severance cut of the separating unit 22 in each case is executed in the region between successive band labels 10.

The band labels 10 separated in succession from the material web 14 are grasped without changing their position, i.e. preserving the upright longitudinal extension, by a band label conveyor 30 and are led at a spacing the one from the other towards the rotary folding unit or the cigarette packet 11. The band label conveyor 30 is a suction conveyor, and has a continuous suction belt 31. The band labels 10 are adjacent to an upright hoistway 32, adjoining it with their printed side, i.e. with the printed area 15.

Suction belt 31 is provided with a continuous row of suction boreholes 33. In the present example, these are arranged offset to the (imagined) longitudinal centre of the suction belt 31, on the side away from the cutting unit 22. The hoistway 32 runs on an upright fixed guide 34. The hoistway 32 can lie adjacent to this guide 34, sliding on it. In the region of the suction boreholes 33, the guide 34 is provided with a groove 35 which is connected via connection boreholes 36 and via a suction pipe 37 with a negative pressure source. In the region of the hoistway 32, negative pressure is applied to the suction belt 31 and becomes effective in the region of the suction boreholes 33. In this way, the band labels 10 are held on the free side of the suction belt 31 or of the hoistway 32.

Figure 4:
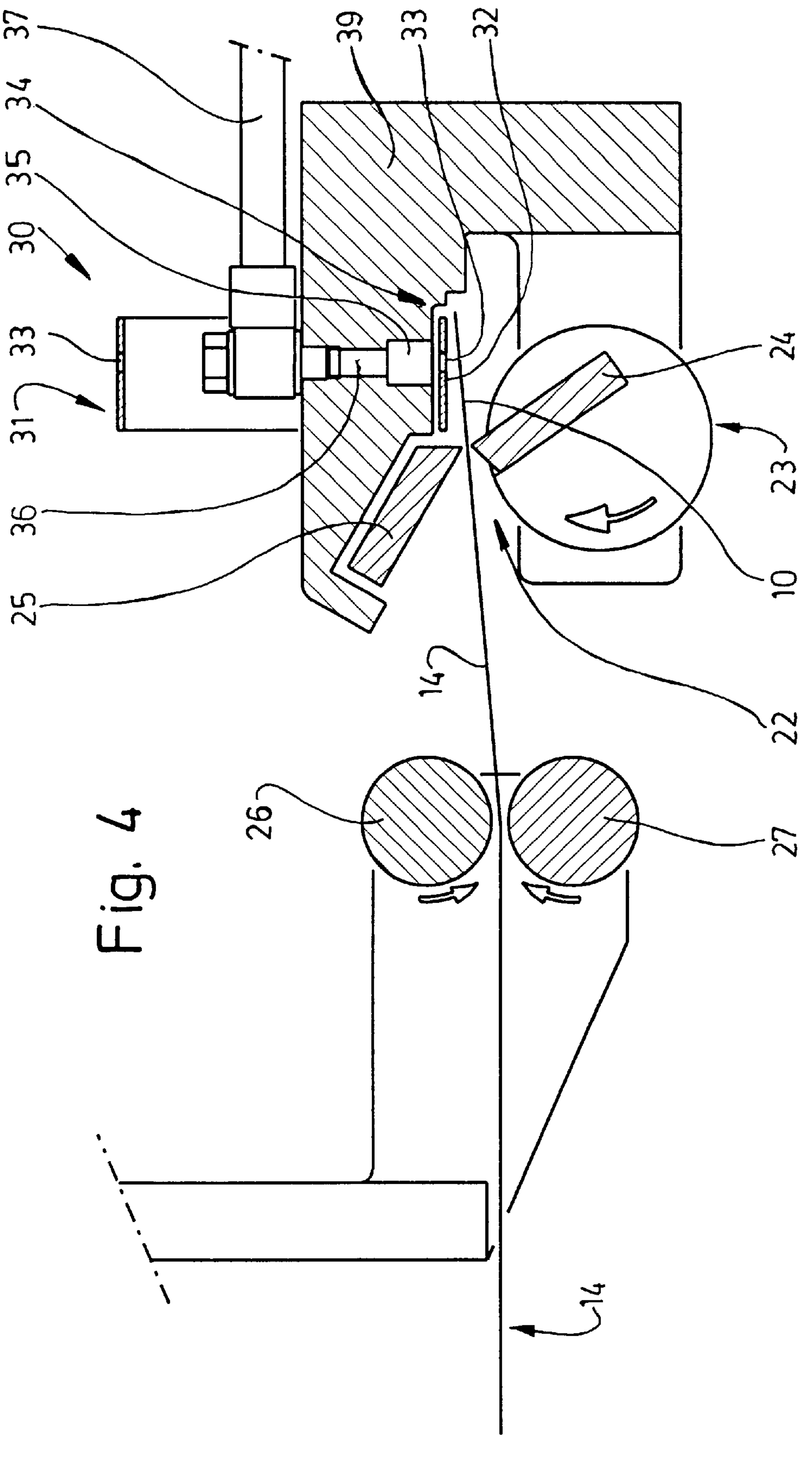
Figure 5:
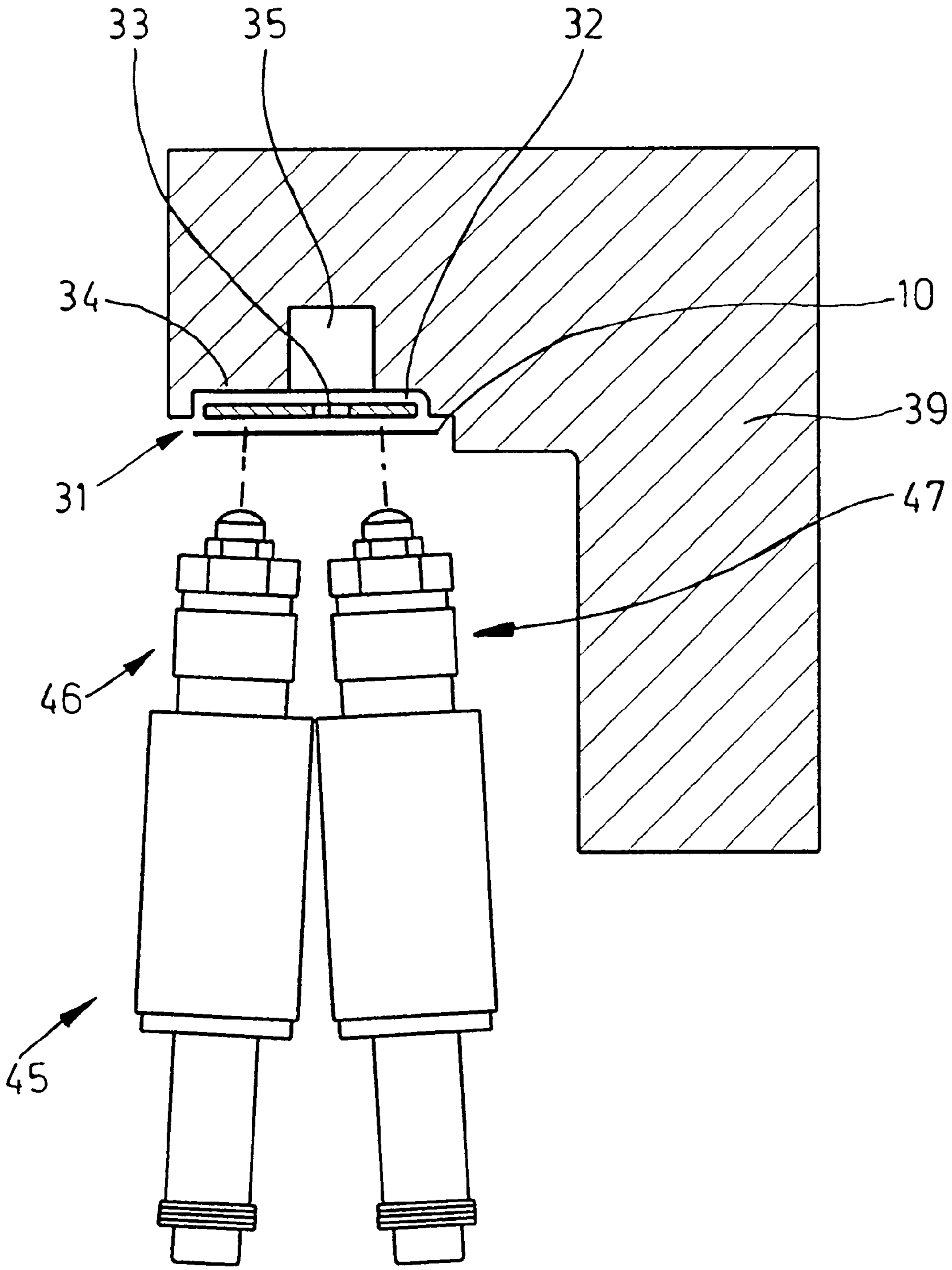

The material web 14 or the section of it which runs horizontally, is led in the region between the feed rollers 26, 27 and the suction belt 31 at an acute angle to the suction belt or to its hoistway 32 through corresponding kinking. The oblique position of the material web 14 (FIG. 4) prevents said web from coming into contact with the suction belt 31 before the band label 10 is separated. The transfer of the band label 10 to the band label conveyor 30 only takes place once the label has been separated from the material web 14.

The band label conveyor is mounted with an upper deflection roller 38 on a mount 39. This is also the carrier for the cutter wheel 23 and a drive 40 for same. The band label conveyor 30 is driven by a synchronous belt 41.

In the conveying region of the band labels 10 by the band label conveyor 30, the band labels 10 are provided with glue on their free side lying away from the hoistway 32. A special feature consists in the fact that the band labels are provided with glue spots 42. The glue spots 42 are applied as (upright) rows of spots 43, 44. On the present embodiment, two rows of spots 43, 44 of this kind are provided, consisting of a plurality of glue spots 42, for example five. The rows of spots 43, 44 extend adjacent to the longitudinal edges of the band labels 10, i.e. in the longitudinal direction of same.

Figure 1:
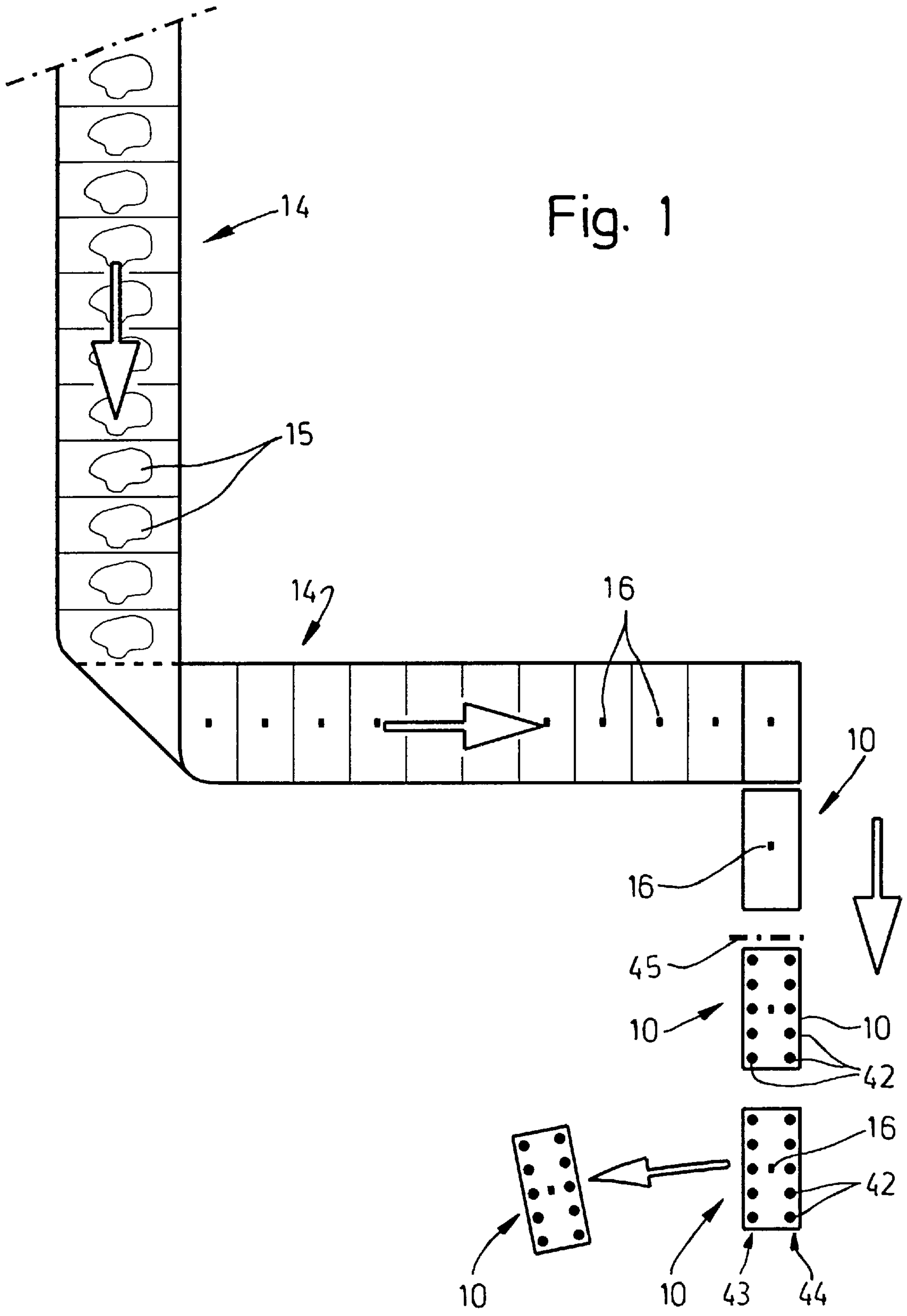
FIG. 1 a schematic view of the movement path of a material web as well as of the band labels separated from same, in side view, FIG. 2 a simplified view of a device for material web and band labels, likewise in side view, FIG. 3 a detail of the device according to FIG. 2 in the region of a cutting station, on an enlarged scale, FIG. 4 the device according to FIG. 2 in a horizontal section IV—IV, on an enlarged scale, FIG. 5 a further horizontal section of the device according to FIG. 2 in the cutting plane V—V, likewise on an enlarged scale, FIG. 6 the transfer of band labels to packets, in side view, FIG. 7 a transverse vertical taken along line VII—VII section of FIG. 6.
Figure 2:
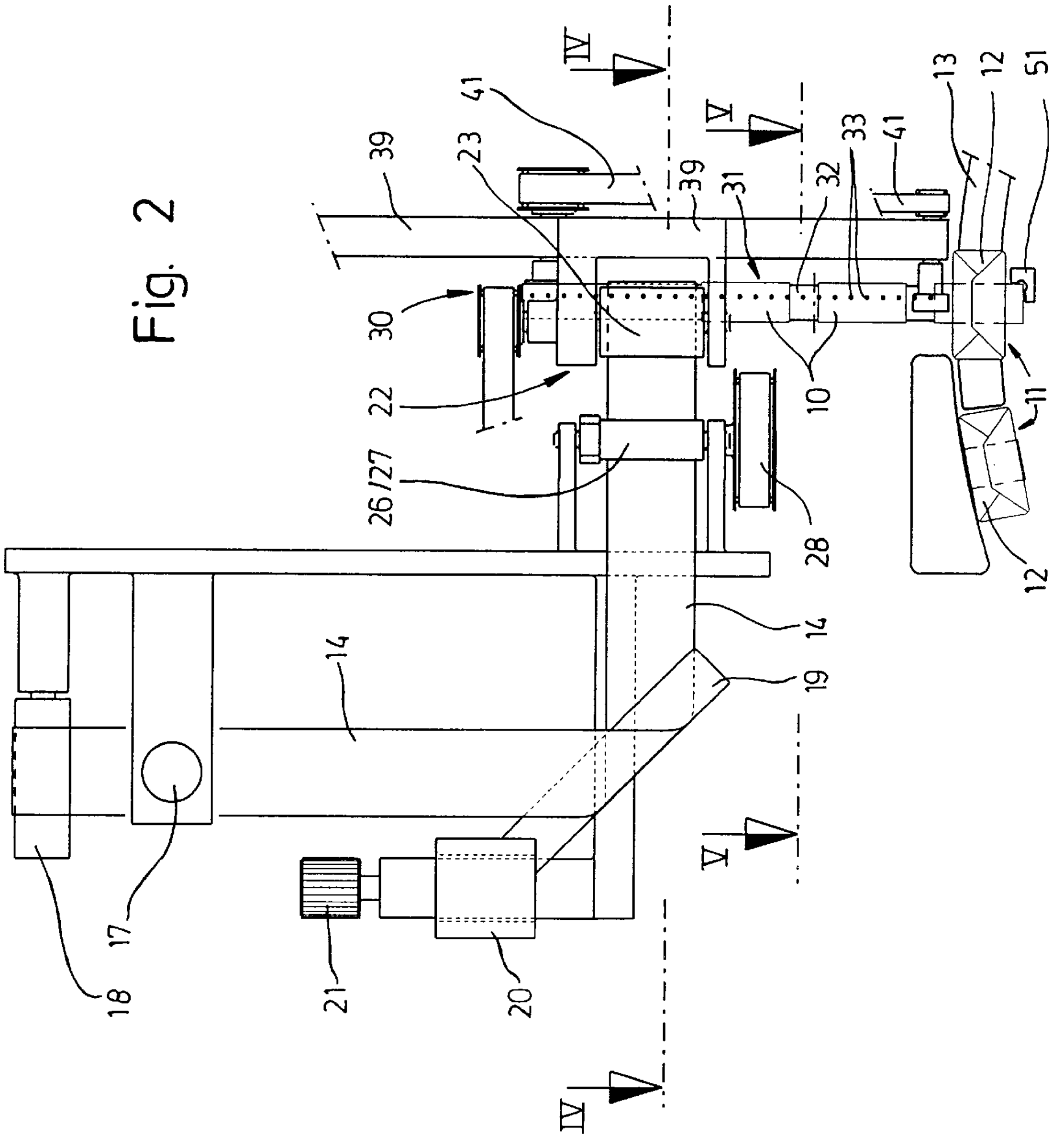
Figure 3:
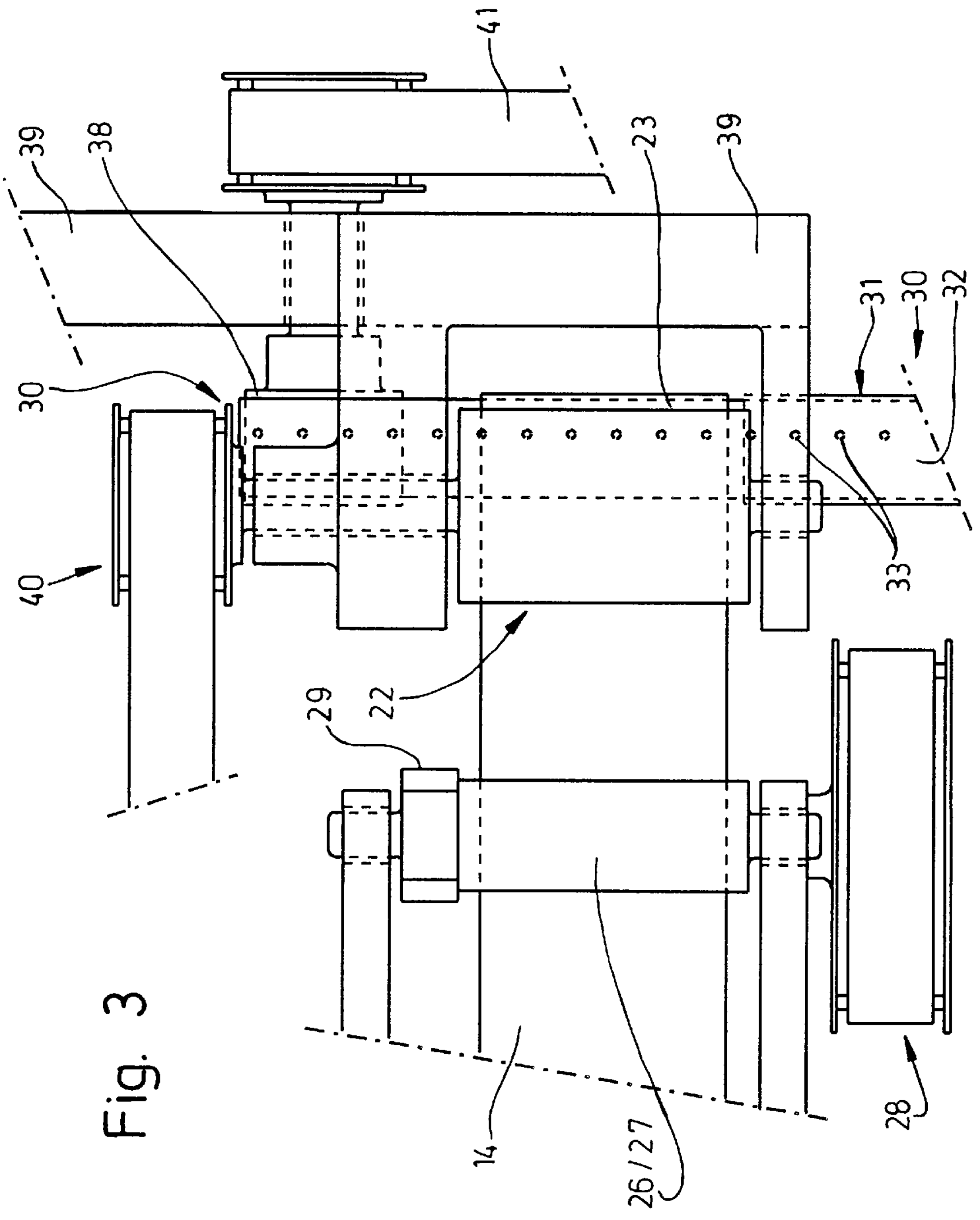

A gluing assembly 45 is provided to apply the glue. This assembly consists of two adjacent glue nozzles 46, 47. The glue nozzles are provided with glue in a suitable known fashion. The glue nozzles 46, 47 positioned at an acute angle to one another, i.e. converging, are so controlled that, during the conveying movement of the band label 10, the two rows of spots 43, 44 consisting of glue spots 42 are transferred to the band label 10 by phased actuation, namely opening of the glue nozzles 46, 47. In FIG. 1 and FIG. 2, the gluing plane is indicated by dot-dash lines.

Figure 7:
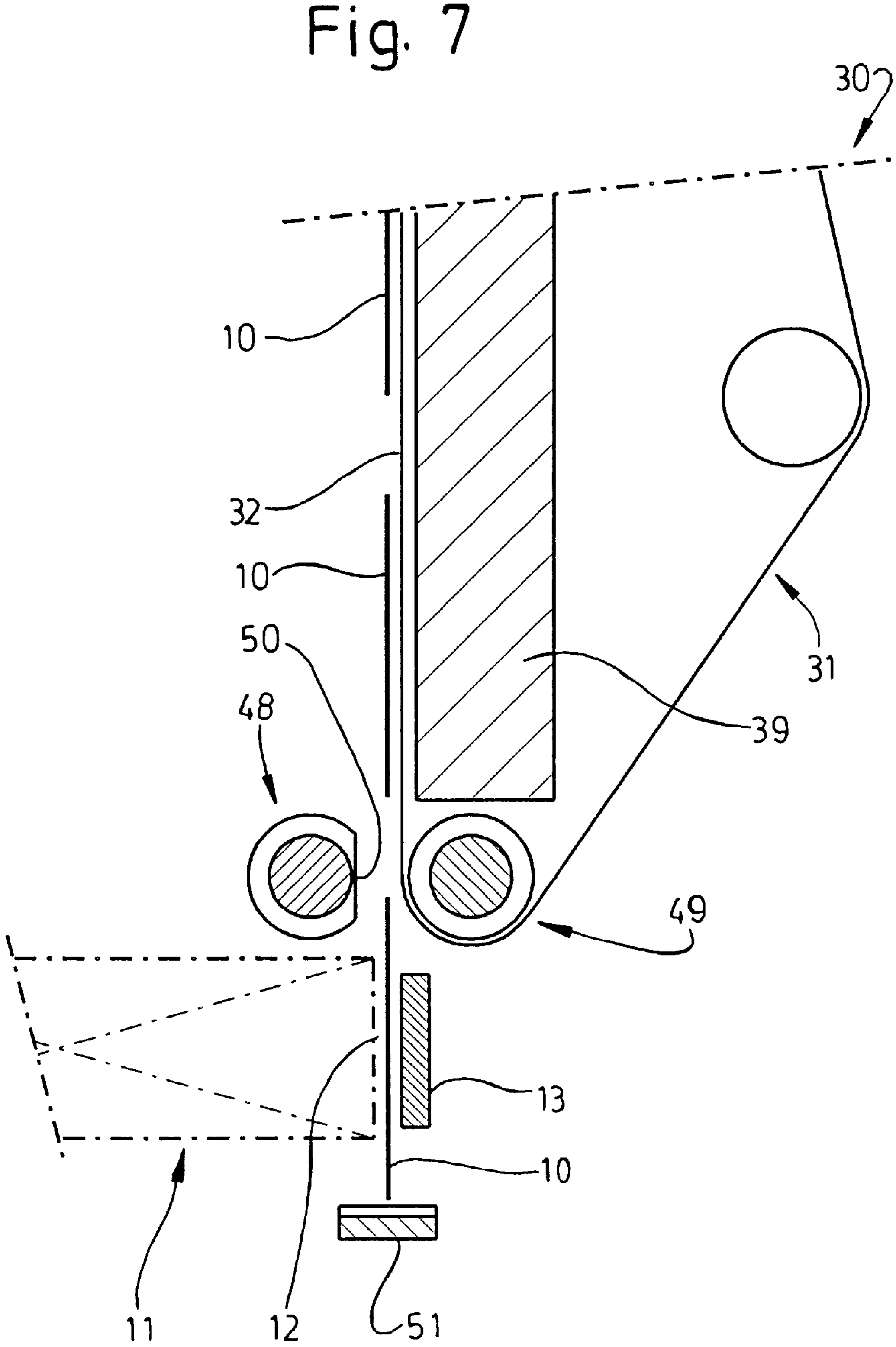

The labels 10 provided with glue are conveyed by the label conveyor 30 into a position above or outside the movement path of the cigarette packets 11 transported by a rotary folding unit (FIG. 7). A further conveying organ, namely a conveying roller 48, serves to transfer the band labels 10 into an end position (FIG. 7, below) to be transferred by the cigarette packet 11 or to be conveyed onwards in the manner described. The conveying roller is positioned opposite a lower deflection roller 49 of the suction belt 31 and co-operates with same. The band label is gripped between the conveying roller 48 and deflection roller 49 and transported onwards, namely upwards. The conveying roller 48 is so configured in an axial direction or of such dimensions that it grips the band label 10 in the region between the rows of spots 43, 44. A flattening 50 of the conveying roller 48 releases the band label 10 once it has reached the (lower) end position. The band label 10 can now be carried away in the described manner in a transverse direction, namely along the perimeter of the rotary folding unit. The lower end position of the band label 10 is determined by an angular supporting section 51. The band label 10 is supported on same with a lower transverse edge and a longitudinal edge. The supporting section 51 guarantees the exact end position of the label.

We claim:

1. A method for manufacturing elongated, rectangular printed band labels (10) and for applying each of the labels to an end wall (12) of a cigarette packet (11), comprising the steps of:

a) separating the labels one after the other from a continuous elongated material web (14) moving in a horizontal direction with the width of the web parallel to a vertical plane where the longitudinal dimension of each of the labels is transverse to the horizontal direction of the web in such a way that the width of the web corresponds to the longitudinal dimension of the labels;

b) providing on only one side of the web a plurality of printed areas (15) for a succession of the labels, providing severance cuts in the web to form the labels between the areas, and separating the labels at the cuts;

c) after the labels are separated, continuously transporting the labels, by a suction conveyor belt (31) moving in a second vertical plane substantially parallel the vertical plane of the web, in a conveying direction transverse to the horizontal direction of the web and in the second vertical plane, with the longitudinal dimension pointing in the conveying direction;

d) holding the separated labels at a distance from each other by negative pressure from the suction conveyor belt which acts on the printed side, and applying glue directly to the print-free side of the held labels;

e) executing the glue-applying step, during the continuous transporting of the labels in the second vertical plane, by a phased and non-contact application of at least one row (43, 44) of successive glue spots (42) extending along the longitudinal dimension of the labels; and f) applying the labels to the packets.

2. The method according to claim 1, wherein the glue-applying step comprises applying two rows of the glue spots running adjacent to opposite longitudinal edges of the labels.

3. The method according the claim 2, further comprising the step of, before applying the labels to the packets, gripping the labels between the two rows of the glue spots by means of pressure and counterpressure provided by a conveying roller (48) and a counter roller, respectively, and transporting the labels to an end position for transfer to the packets.

* * * * *